US012183533B2

(12) United States Patent
Pan et al.

(10) Patent No.: US 12,183,533 B2
(45) Date of Patent: Dec. 31, 2024

(54) LINKAGE STRUCTURE OF KEY SWITCH

(71) Applicant: DEFOND ELECTECH CO., LTD, Dongguan (CN)

(72) Inventors: Hua Lin Pan, Dongguan (CN); Xiao Yu Lai, Dongguan (CN); Cheng Chen Nieh, Dongguan (CN); Ka Leung Chan, Dongguan (CN)

(73) Assignee: DEFOND ELECTECH CO., LTD, Dongguan (CN)

( * ) Notice: Subject to any disclaimer, the term of this patent is extended or adjusted under 35 U.S.C. 154(b) by 177 days.

(21) Appl. No.: 18/164,683

(22) Filed: Feb. 6, 2023

(65) Prior Publication Data

US 2024/0222042 A1 Jul. 4, 2024

(30) Foreign Application Priority Data

Dec. 29, 2022 (CN) ......................... 202223520253.0

(51) Int. Cl.

*H01H 13/14* (2006.01)
*H01H 9/26* (2006.01)
*H01H 13/70* (2006.01)
*H01H 9/10* (2006.01)

(52) U.S. Cl.

CPC .............. *H01H 9/26* (2013.01); *H01H 13/14* (2013.01); *H01H 13/7013* (2013.01); *H01H 9/10* (2013.01)

(58) Field of Classification Search

CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20

See application file for complete search history.

(56) References Cited

U.S. PATENT DOCUMENTS

| | | | | |
|---|---|---|---|---|
| 7,381,919 B1 * | 6/2008 | Yu | H01H 21/24 | 200/296 |
| 8,787,029 B2 * | 7/2014 | Yang | H01H 9/16 | 361/679.01 |
| 8,841,569 B2 * | 9/2014 | Liang | H01H 3/122 | 200/344 |
| 10,790,099 B2 * | 9/2020 | Yeh | G06F 1/24 | |

FOREIGN PATENT DOCUMENTS

| | | |
|---|---|---|
| CN | 104065364 A | 9/2014 |
| CN | 210984551 U | 7/2020 |
| CN | 212322888 U | 1/2021 |

* cited by examiner

*Primary Examiner* — Ahmed M Saeed

(57) ABSTRACT

The present invention relates to a linkage structure of a key switch. A second key and a fourth key share one bridge and are connected by a first connecting rod. When the second key or the fourth key is pressed down, the first connecting rod is pushed, so that a first bridge metal dome deforms and is connected to a common contact piece for conduction. A third key and a fifth key share one bridge and are connected by a second connecting. When the third key or the fifth key is pressed down, the second connecting rod is pushed, so that a second bridge metal dome deforms and is connected to the common contact piece for conduction. An input terminal is connected in series to a fuse, and the second key and the fourth key are connected in series to a diode so as to output a rectification half-wave.

10 Claims, 12 Drawing Sheets

LINKAGE STRUCTURE OF KEY SWITCH

CROSS-REFERENCE TO RELATED APPLICATIONS

The application claims priority to Chinese patent application No. 202223520253.0, filed on Dec. 29, 2022, the entire contents of which are incorporated herein by reference.

TECHNICAL FIELD

The present invention relates to the technical field of switches, and particularly relates to a linkage structure of a key switch.

BACKGROUND

A key switch with five keys usually has five keys: an Off gear, a low speed gear, a high speed gear, a low speed inching gear and a high speed inching gear. In order to achieve the low speed and high speed gears, a diode is usually used for regulating speed at the high speed gear and the low speed gear. The low speed gear and the low speed inching gear achieve a low speed through rectified output of the diode. The high speed gear and the high speed inching gear directly skip the output of the diode. The low speed inching gear is connected to a low speed gear terminal at the bottom of the switch via a wire, and the high speed inching gear is also connected to a high speed gear terminal at the bottom of the switch via a wire.

In the switch, except the Off gear position, the other four gears each has an independent bridge circuit to achieve on and off of the function. The four bridge circuits are matched with external connecting wires to achieve output in a circuit diagram shown in FIG. 1.

With respect to an existing key switch with five keys, due to its structural characteristics, the keys need to be connected at the periphery of the switch through wires or the keys are internally connected through wires, so that the four bridge circuits achieve linked output.

SUMMARY

In order to overcome shortcomings and deficiencies in the prior art, the objective of the present invention is to provide a linkage structure of a key switch.

The objective of the present invention is achieved by the following technical solution: a linkage structure of a key switch includes a bottom shell, a surface shell clamped to the top of the bottom shell, five push rods successively inserted onto the surface shell and five keys clamped to the top of the push rods, respectively, where the linkage structure of the key switch further includes:

- a self-locking assembly, capable of self-locking the second push rod and the third push rod
- a linkage assembly, comprising a first connecting rod connected between the second push rod and the fourth push rod and a second connecting rod connected between the third push rod and the fifth push rod;
- an input assembly, comprising an input terminal, a common contact piece arranged opposite the input terminal and a fuse connected between the input terminal and the common contact piece; and
- an output assembly, comprising a first bridge metal dome arranged on one side of the first connecting rod, a second bridge metal dome arranged on one side of the second connecting rod, an output terminal fixed to the second bridge metal dome and a diode connected between the first bridge metal dome and the second bridge metal dome; and
- where the other ends of the input terminal and the output terminal both stretch out of the bottom shell, and the first bridge metal dome and the second bridge metal dome are oppositely arranged on one side of the common contact piece.

Preferably, movable contacts are fixed to the inner sides of the first bridge metal dome and the second bridge metal dome, and stationary contacts are fixed in positions of the common contact piece relative to the two movable contacts.

Preferably, two oppositely arranged installation plates extend towards one side of the input terminal and the common contact piece, the two installation plates both stretch out of the bottom shell, a fixed groove is formed in a position between the two corresponding installation plates at the bottom of the bottom shell, the fuse is placed in the fixed groove, and both ends of the fuse are clamped to the two installation plates.

Preferably, free ends of two pins of the diode are relatively bent to form clamping portions, the bottoms of the first bridge metal dome and the second bridge metal dome both stretch out of the bottom shell, the clamping portions at both ends of the diode are clamped to the bottoms of the first bridge metal dome and the second bridge metal dome, and supporting seats for supporting the pins are fixed to non-free ends of the two pins corresponding to the bottom of the bottom shell.

Preferably, the first connecting rod and the second connecting rod both are U-shaped, one ends of the first connecting rod and the second connecting rod are respectively bent inwards to form contact ends, and the contact ends of the first connecting rod and the second connecting rod are respectively located on the outer sides of the first bridge metal dome and the second bridge metal dome.

Preferably, the self-locking assembly includes a self-locking piece, a return spring sleeved at one end of the self-locking piece and three interlocking pieces installed on one side of the self-locking piece, the middle part of each push rod is outwardly provided with a self-locking rod in a protruding manner, and the self-locking rod is in butt joint to the self-locking piece.

Preferably, the position of the self-locking piece corresponding to each self-locking rod is provided with an inclined groove, and the sides of the inclined grooves corresponding to the second self-locking rod and the third self-locking rod are provided with inverted grooves.

Preferably, the outer side of the top of each push rod is sleeved with a reset spring, the top of each reset spring is clamped to the top of the corresponding push rod, and the bottom of each reset spring is in abut joint to the top of the surface shell.

Preferably, the outer side surfaces of the five keys are arranged in an arc shape.

Preferably, the five keys correspond to a reset gear, a low speed gear, a high speed gear, a low speed inching gear and a high speed inching gear respectively.

The present invention has the beneficial effects that according to the linkage structure of the key switch provided by the present invention, a second key and a fourth key share one bridge and are connected by a first connecting rod. When the second key or the fourth key is pressed down, the first connecting rod is pushed, so that a first bridge metal dome deforms and is connected to a common contact piece for conduction, and therefore, the two keys share one bridge circuit. A third key and a fifth key share one bridge and are connected by a second connecting. When the third key or the fifth key is pressed down, the second connecting rod is pushed, so that a second bridge metal dome deforms and is connected to the common contact piece for conduction, and therefore, the two keys share one bridge circuit. An input terminal is connected in series to a fuse, and the second key and the fourth key are connected in series to a diode so as to output a rectification half-wave. Under a condition that the overall output circuit is unchanged, conductor connection is removed by designing a novel structure. Moreover, the number of bridges decreases, so that a purpose of saving the cost is achieved.

Figure 1:
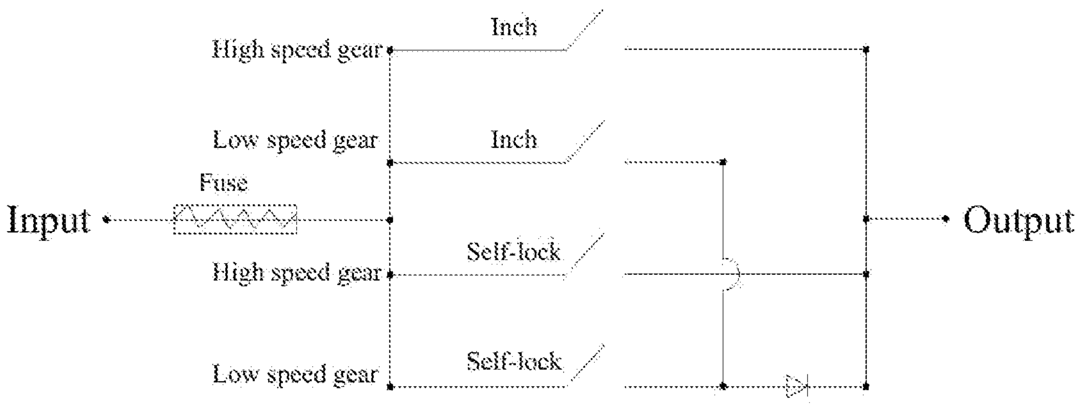
FIG. 1 is a circuit diagram of an existing key switch with five keys.

Numerals in the drawings: 1—bottom shell; 11—fixed groove; 12—supporting seat; 2—surface shell; 3—push rod; 31—self—locking rod; 32—reset spring; 4—key; 41—reset gear; 42—low speed gear; 43—high speed gear; 44—low speed inching gear; 45—high speed inching gear; 5—self—locking assembly; 51—self—locking piece; 52—return spring; 53—interlocking piece; 54—inclined groove; SS—inverted groove; 6—linkage assembly; 61—first connecting rod; 62—second connecting rod; 63—contact end; 7—input assembly; 71—input terminal; 72—common contact; 73—fuse; 74—stationary contact; 75—installation plate; 8—output assembly; 81—first bridge metal dome; 82—second bridge metal dome; 83—output terminal; 84—diode; 85—movable contact; 86—clamping portion.

DETAILED DESCRIPTION OF THE EMBODIMENTS

In order to facilitate understanding of those skilled in the art, the present invention will be further described below in combination with embodiments and drawings 1-12. The contents mentioned in the embodiments do not limit the present invention.

Figure 2:
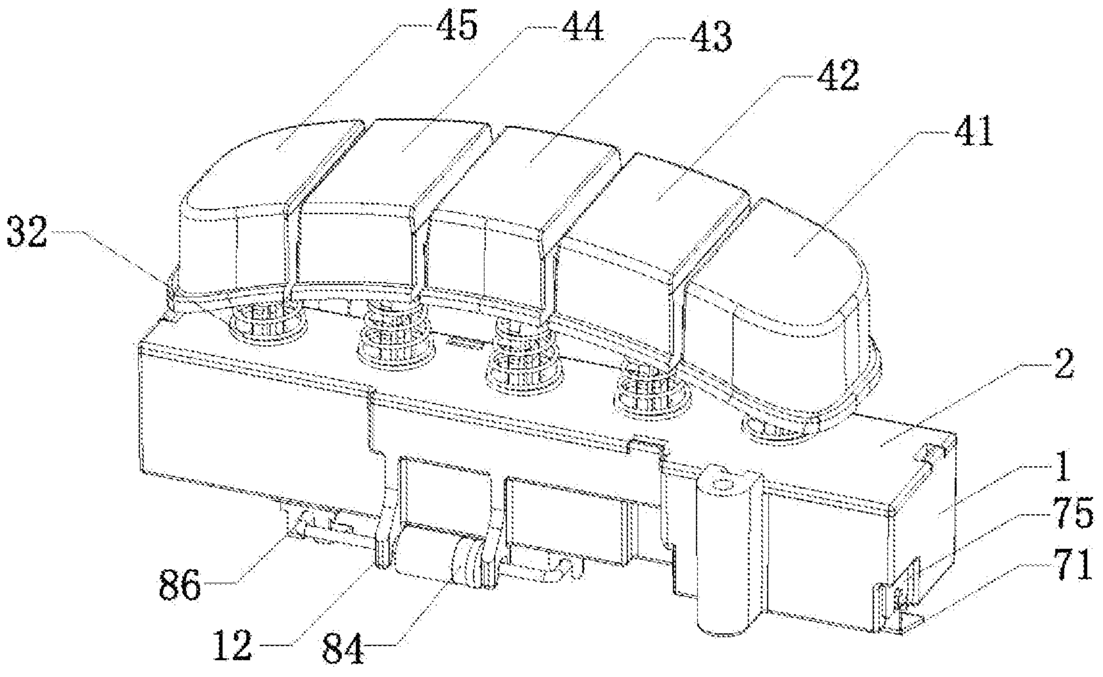
FIG. 2 is a three-dimensional diagram of the present invention.
Figure 3:
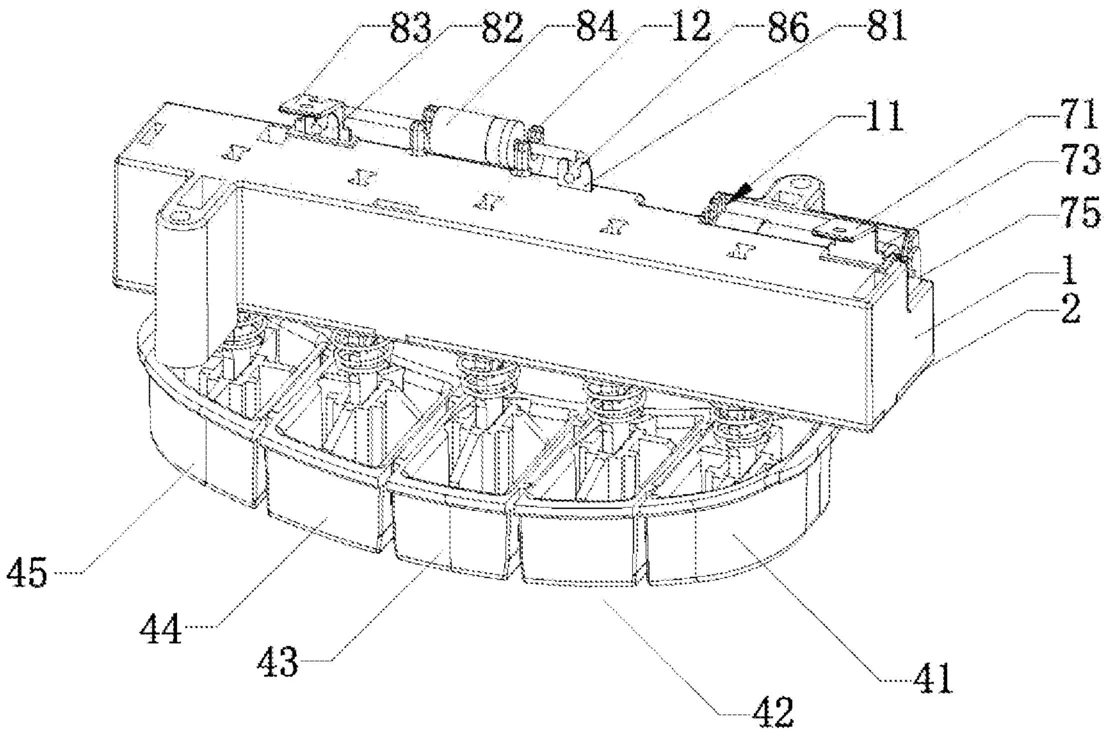
FIG. 3 is a three-dimensional diagram of the present invention from another view.
Figure 4:
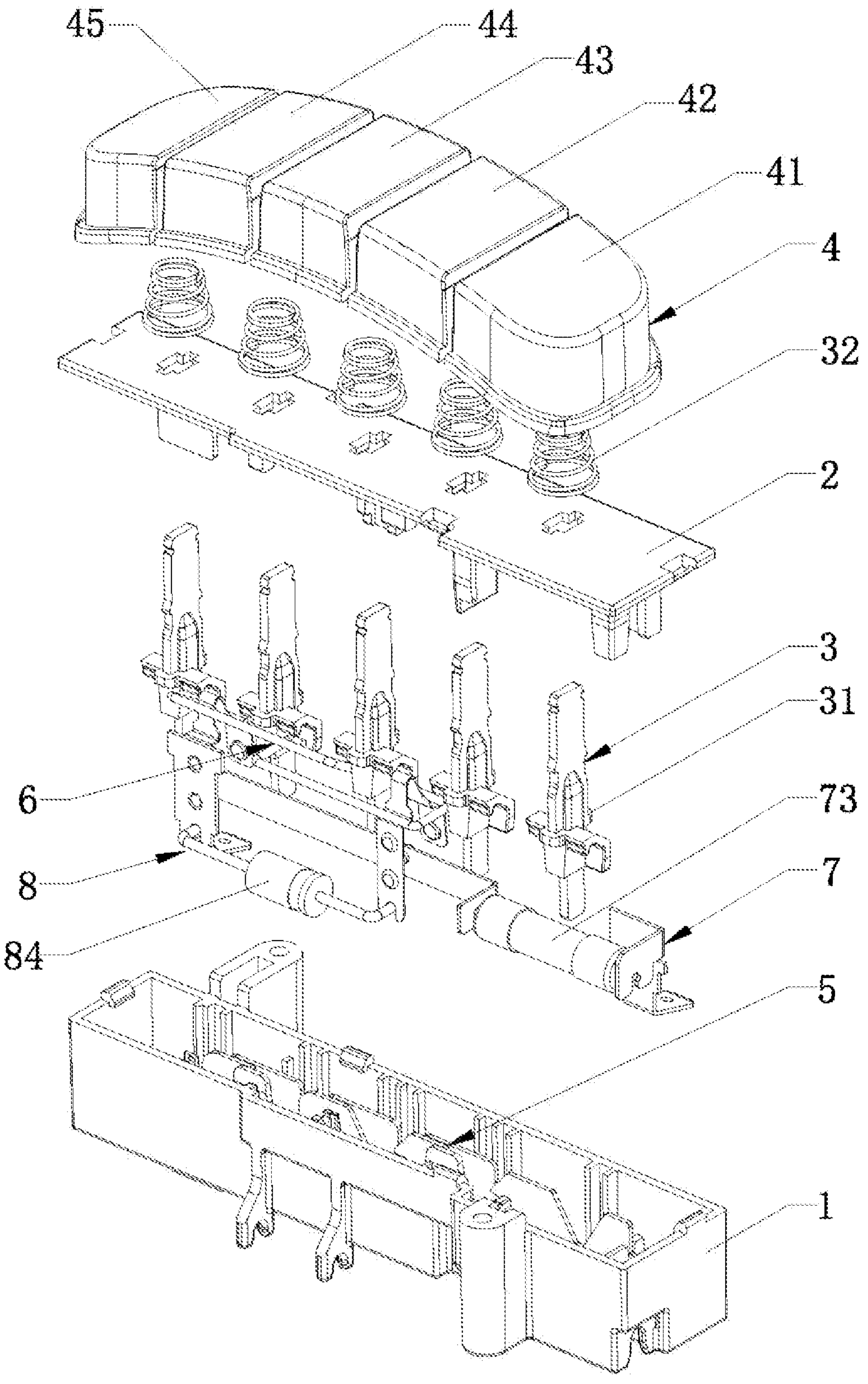
FIG. 4 is a three-dimensional exploded view of the present invention.
Figure 5:
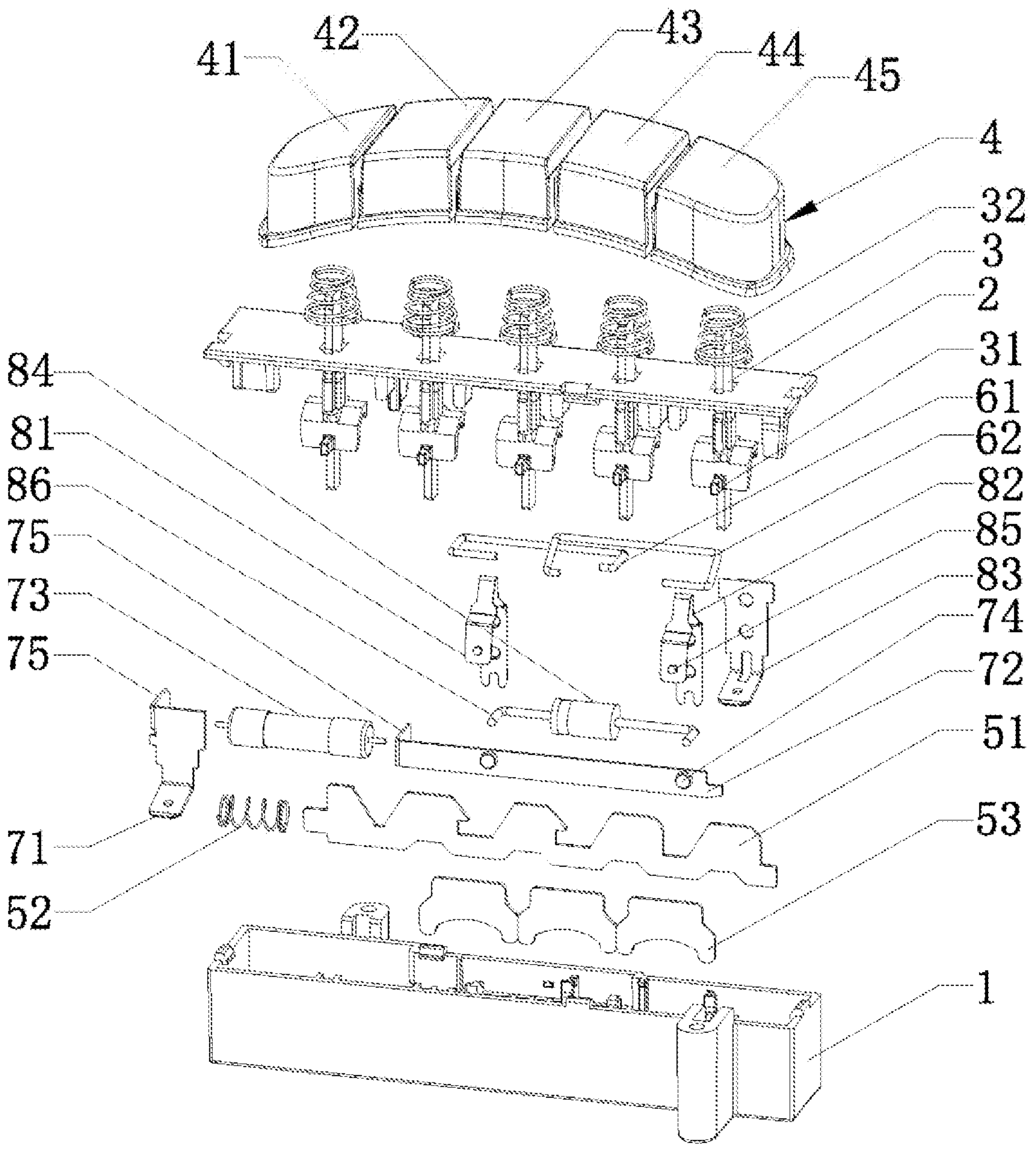
FIG. 5 is a three-dimensional exploded view of the present invention from another view.
Figure 6:
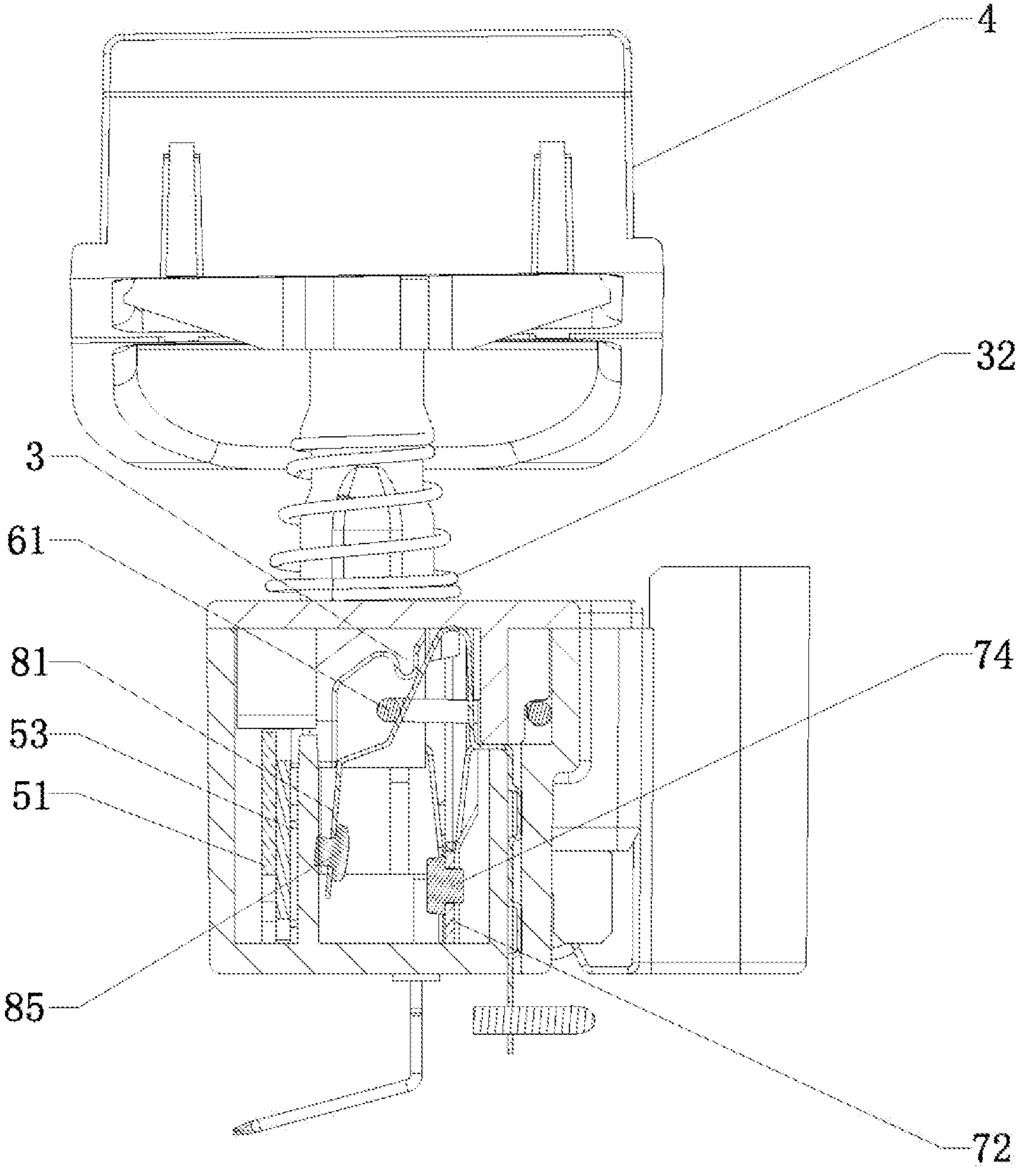
FIG. 6 is a section view of the present invention.
Figure 7:
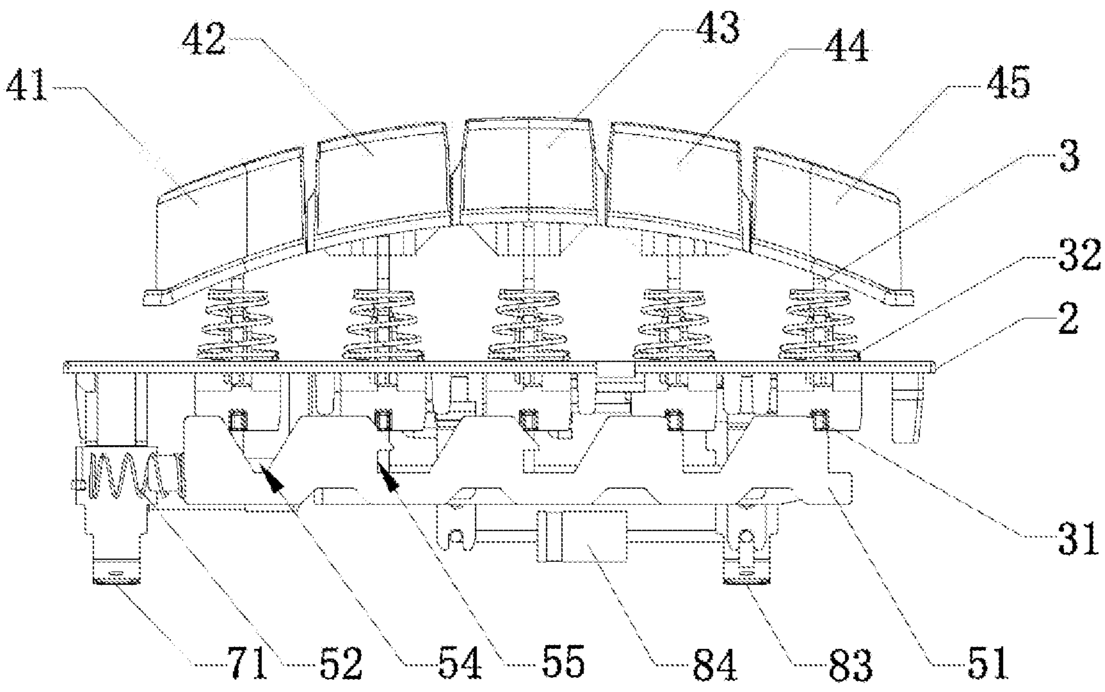
FIG. 7 is an installation structural diagram of the self-locking piece of the present invention.
Figure 8:
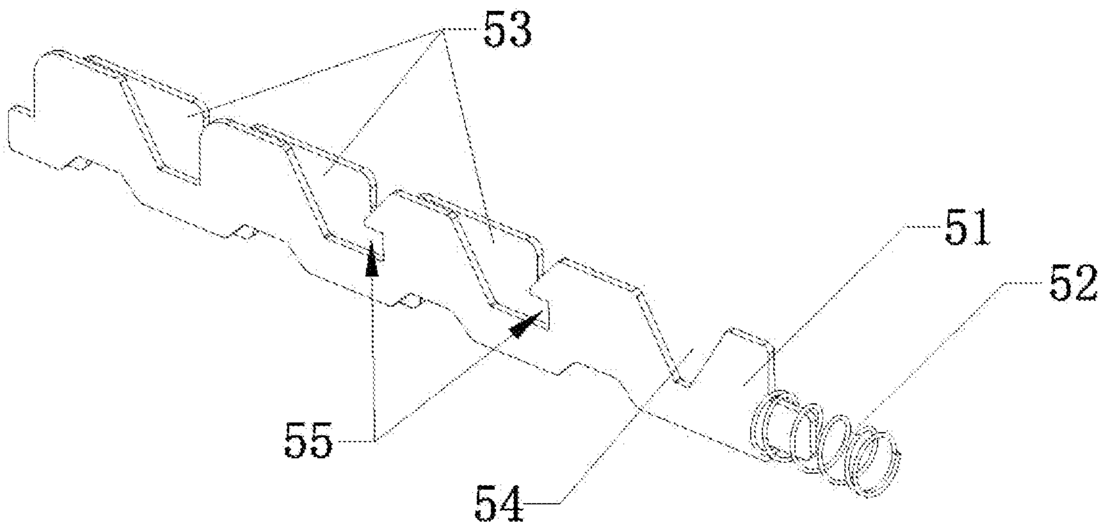
FIG. 8 is a three-dimensional diagram of the self-locking assembly of the present invention.
Figure 9:
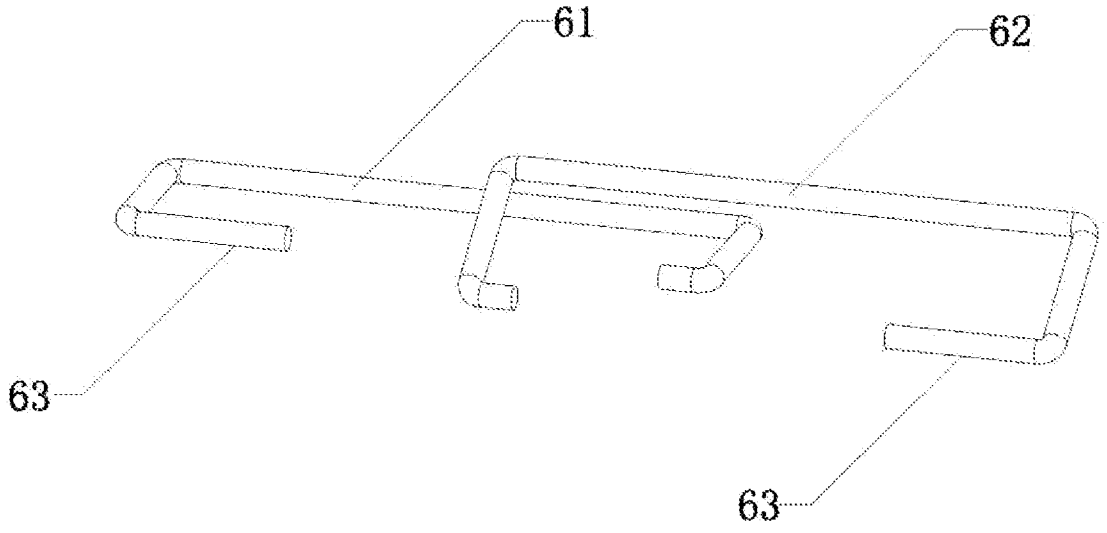
FIG. 9 is a three-dimensional diagram of the linkage assembly of the present invention.
Figure 10:
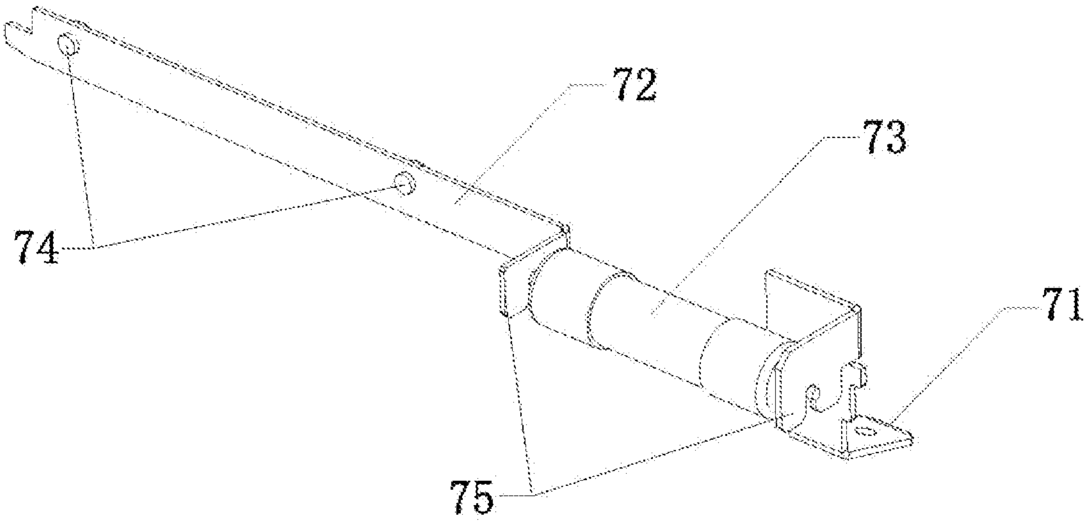
FIG. 10 is a three-dimensional diagram of the input assembly of the present invention.
Figure 11:
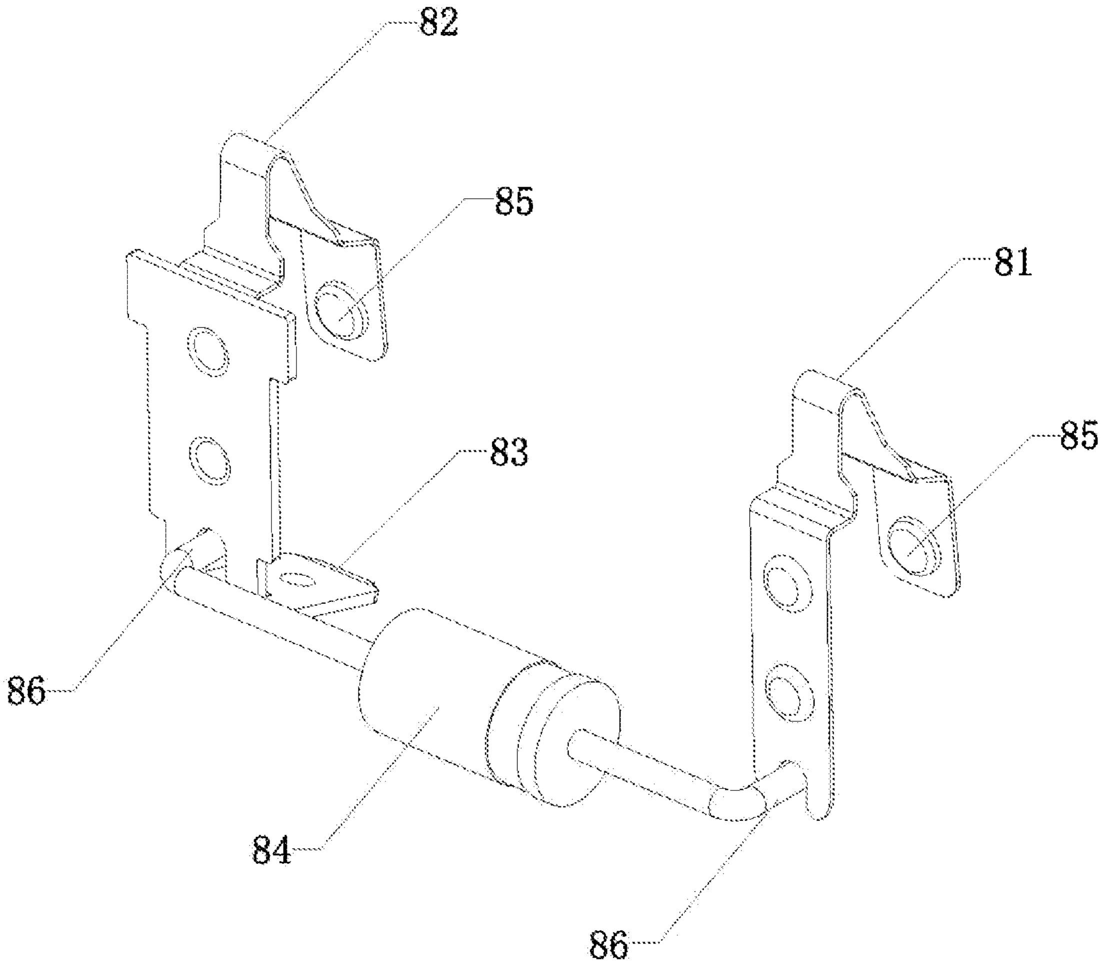
FIG. 11 is a three-dimensional diagram of the output assembly of the present invention.
Figure 12:
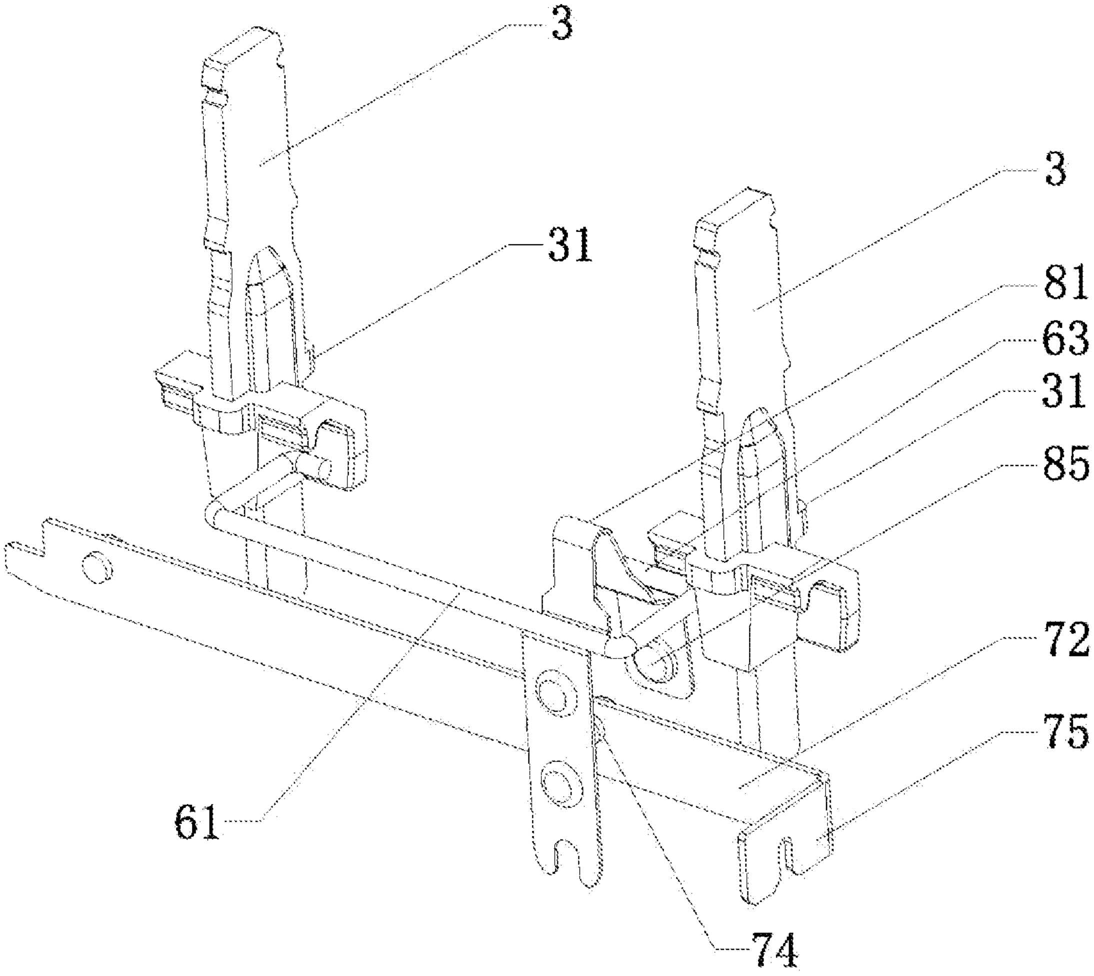
FIG. 12 is a combined three-dimensional diagram of the first connecting rod, the first bridge metal dome and the common contact piece.

As shown in FIG. 1-12, a linkage structure of a key switch includes a bottom shell 1, a surface shell 2 clamped to the top of the bottom shell 1, five push rods 3 successively inserted onto the surface shell 2 and five keys 4 clamped to the top of the push rods 3, respectively, where the linkage structure of the key switch further includes:

a self-locking assembly 5, capable of self-locking the second push rod 3 and the third push rod 3;

a linkage assembly 6, including a first connecting rod 61 connected between the second push rod 3 and the fourth push rod 3 and a second connecting rod 62 connected between the third push rod 3 and the fifth push rod 3;

an input assembly 7, including an input terminal 71, a common contact piece 72 arranged opposite the input terminal 71 and a fuse 73 connected between the input terminal 71 and the common contact piece 72; and an output assembly 8, including a first bridge metal dome 81 arranged on one side of the first connecting rod 61, a second bridge metal dome 82 arranged on one side of the second connecting rod 62, an output terminal 83 fixed to the second bridge metal dome 82 and a diode 84 connected between the first bridge metal dome 81 and the second bridge metal dome 82; and where the other ends of the input terminal 71 and the output terminal 83 both stretch out of the bottom shell 1, and the first bridge metal dome 81 and the second bridge metal dome 82 are oppositely arranged on one side of the common contact piece 72.

In addition, in the above-mentioned embodiments, movable contacts 85 are fixed to the inner sides of the first bridge metal dome 81 and the second bridge metal dome 82, and stationary contacts 74 are fixed in positions of the common contact piece 72 relative to the two movable contacts 85. By arranging the movable contacts 85 and the stationary contacts 74, the output bridge metal dome contacts the common contact piece 72 more reliably.

In addition, in the above-mentioned embodiments, two oppositely arranged installation plates 75 extend towards one side of the input terminal 71 and the common contact piece 72, the two installation plates 75 both stretch out of the bottom shell 1, a fixed groove 11 is formed in a position between the two corresponding installation plates 75 at the bottom of the bottom shell 1, the fuse 73 is placed in the fixed groove 11, and both ends of the fuse 73 are clamped to the two installation plates 75. The fuse 73 is installed in the fixed groove 11 out of the bottom shell 1 by way of clamping, so that the fuse is easily and conveniently assembled.

In addition, in the above-mentioned embodiments, free ends of two pins of the diode 84 are relatively bent to form clamping portions 86, the bottoms of the first bridge metal dome 81 and the second bridge metal dome 82 both stretch out of the bottom shell 1, the clamping portions 86 at both ends of the diode 84 are clamped to the bottoms of the first bridge metal dome 81 and the second bridge metal dome 82, and supporting seats 12 for supporting the pins are fixed to non-free ends of the two pins corresponding to the bottom of the bottom shell 1. The diode 84 is installed on the outer side of the bottom shell 1 by way of clamping, so that the diode is easily and conveniently assembled.

In addition, in the above-mentioned embodiments, the first connecting rod 61 and the second connecting rod 62 both are U-shaped, one ends of the first connecting rod 61 and the second connecting rod 62 are respectively bent inwards to form contact ends 63, and the contact ends 63 of the first connecting rod 61 and the second connecting rod 62 are respectively located on the outer sides of the first bridge metal dome 81 and the second bridge metal dome 82. When the second key 4 or the fourth key 4 is pressed down, the contact end 63 of the first connecting rod 61 is pushed, so that the first bridge metal dome 81 deforms and is connected to the common contact piece 72 for conduction. When the third key 4 or the fifth key 4 is pressed down, the contact end 63 of the second connecting rod 62 is pushed, so that the second bridge metal dome 82 deforms and is connected to the common contact piece 72 for conduction, and therefore, the two keys 4 share one bridge circuit.

In addition, in the above-mentioned embodiments, the self-locking assembly 5 includes a self-locking piece 51, a return spring 52 sleeved at one end of the self-locking piece 51 and three interlocking pieces 53 installed on one side of the self-locking piece 51, the middle part of each push rod 3 is outwardly provided with a self-locking rod 31 in a protruding manner, and the self-locking rod 31 is in butt joint to the self-locking piece 51. The self-locking piece 51 is configured to self-lock the second key 4 and the third key 4, the return spring 52 is configured to reset the self-locking piece 51, and the interlocking pieces 53 play an interlocking role so as to prevent simultaneous connection of the plurality of keys 4.

In addition, in the above-mentioned embodiments, the position of the self-locking piece 51 corresponding to each self-locking rod 31 is provided with an inclined groove 54, and the sides of the inclined grooves 54 corresponding to the second self-locking rod 31 and the third self-locking rod 31 are provided with inverted grooves 55. The inverted grooves 55 are configured to push and lock the second key 4 and the third key 4.

In addition, in the above-mentioned embodiments, the outer side of the top of each push rod 3 is sleeved with a reset spring 32, the top of each reset spring 32 is clamped to the top of the corresponding push rod 3, and the bottom of each reset spring 32 is in abut joint to the top of the surface shell 2. The reset spring 32 is configured to loosen reset of the key 4.

In addition, in the above-mentioned embodiments, the outer side surfaces of the five keys 4 are arranged in an are shape.

In addition, in the above-mentioned embodiments, the five keys 4 correspond to a reset gear 41, a low speed gear 42, a high speed gear 43, a low speed inching gear 44 and a high speed inching gear respectively 45. Specifically, the first to fifth push rods 3 correspond to the reset gear 41, the low speed gear 42, the high speed gear 43, the low speed inching gear 44 and the high speed inching gear 45 respectively.

According to the linkage structure of the key switch provided by the present invention, the low speed gear 42 is connected to the low speed inching gear 44 through the connecting rod, so that one low speed bridge circuit is shared. The high speed gear 43 is connected to the high speed inching gear 45 through the connecting rod, so that one high speed bridge circuit is shared. Therefore, low speed inching bridges and high speed inching bridges are reduced, so that connection of peripheral wires is reduced. There are only the input terminal 71 and the output terminal 83 at the periphery of the switch, so that the assembly cost and the material cost are greatly lowered.

The above-mentioned embodiments are preferred embodiments of the present invention. Besides, the present invention can further be implemented in other manners. Any obvious replacement shall within the protection scope of the present invention without departing the conception of the present invention.

What is claimed is:

1. A linkage structure of a key switch, comprising a bottom shell, a surface shell clamped to the top of the bottom shell, five push rods successively inserted onto the surface shell and five keys clamped to the top of the push rods, respectively, wherein the linkage structure of the key switch further comprises:

a self-locking assembly, capable of self-locking the second push rod and the third push rod;

a linkage assembly, comprising a first connecting rod connected between the second push rod and the fourth push rod and a second connecting rod connected between the third push rod and the fifth push rod;

an input assembly, comprising an input terminal, a common contact piece arranged opposite the input terminal and a fuse connected between the input terminal and the common contact piece; and an output assembly, comprising a first bridge metal dome arranged on one side of the first connecting rod, a second bridge metal dome arranged on one side of the second connecting rod, an output terminal fixed to the second bridge metal dome and a diode connected between the first bridge metal dome and the second bridge metal dome; and wherein the other ends of the input terminal and the output terminal both stretch out of the bottom shell, and the first bridge metal dome and the second bridge metal dome are oppositely arranged on one side of the common contact piece.

2. The linkage structure of a key switch according to claim 1, wherein movable contacts are fixed to the inner sides of the first bridge metal dome and the second bridge metal dome, and stationary contacts are fixed in positions of the common contact piece relative to the two movable contacts.

3. The linkage structure of a key switch according to claim 1, wherein two oppositely arranged installation plates extend towards one side of the input terminal and the common contact piece, the two installation plates both stretch out of the bottom shell, a fixed groove is formed in a position between the two corresponding installation plates at the bottom of the bottom shell, the fuse is placed in the fixed groove, and both ends of the fuse are clamped to the two installation plates.

4. The linkage structure of a key switch according to claim 1, wherein free ends of two pins of the diode are relatively bent to form clamping portions, the bottoms of the first bridge metal dome and the second bridge metal dome both stretch out of the bottom shell, the clamping portions at both ends of the diode are clamped to the bottoms of the first bridge metal dome and the second bridge metal dome, and supporting seats for supporting the pins are fixed to non-free ends of the two pins corresponding to the bottom of the bottom shell.

5. The linkage structure of a key switch according to claim 1, wherein the first connecting rod and the second connecting rod both are U-shaped, one ends of the first connecting rod and the second connecting rod are respectively bent inwards to form contact ends, and the contact ends of the first connecting rod and the second connecting rod are respectively located on the outer sides of the first bridge metal dome and the second bridge metal dome.

6. The linkage structure of a key switch according to claim 1, wherein the self-locking assembly comprises a self-locking piece, a return spring sleeved at one end of the self-locking piece and three interlocking pieces installed on one side of the self-locking piece, the middle part of each push rod is outwardly provided with a self-locking rod in a protruding manner, and the self-locking rod is in butt joint to the self-locking piece.

7. The linkage structure of a key switch according to claim 5, wherein the position of the self-locking piece corresponding to each self-locking rod is provided with an inclined groove, and the sides of the inclined grooves corresponding to the second self-locking rod and the third self-locking rod are provided with inverted grooves.

8. The linkage structure of a key switch according to claim 1, wherein the outer side of the top of each push rod is sleeved with a reset spring, the top of each reset spring is clamped to the top of the corresponding push rod, and the bottom of each reset spring is in abut joint to the top of the surface shell.

9. The linkage structure of a key switch according to claim 1, wherein the outer side surfaces of the five keys are arranged in an arc shape.

10. The linkage structure of a key switch according to claim 1, wherein the five keys correspond to a reset gear, a low speed gear, a high speed gear, a low speed inching gear and a high speed inching gear respectively.

* * * * *